US009705279B2

United States Patent
Holzwarth et al.

(10) Patent No.: US 9,705,279 B2
(45) Date of Patent: Jul. 11, 2017

(54) OPTICAL RESONATOR ARRANGEMENT AND A METHOD FOR ADJUSTING A ROUND-TRIP TIME IN A RESONATOR

(71) Applicant: Menlo Systems GmbH, Martinsried (DE)

(72) Inventors: Ronald Holzwarth, Groebenzell (DE); Wolfgang Haensel, Munich (DE)

(73) Assignee: MENLO SYSTEMS GMBH, Martinsried (DE)

( * ) Notice: Subject to any disclaimer, the term of this patent is extended or adjusted under 35 U.S.C. 154(b) by 0 days.

(21) Appl. No.: 14/978,798

(22) Filed: Dec. 22, 2015

(65) Prior Publication Data

US 2016/0181759 A1 Jun. 23, 2016

(30) Foreign Application Priority Data

Dec. 23, 2014 (DE) .................. 10 2014 226 973

(51) Int. Cl.
*H01S 3/10* (2006.01)
*H01S 3/106* (2006.01)
(Continued)

(52) U.S. Cl.
CPC ........ *H01S 3/1062* (2013.01); *H01S 3/08054* (2013.01); *H01S 3/106* (2013.01); *H01S 3/109* (2013.01); *H01S 3/137* (2013.01); *H01S 3/06791* (2013.01); *H01S 3/083* (2013.01); *H01S 3/0816* (2013.01); *H01S 3/107* (2013.01); *H01S 3/1065* (2013.01); *H01S 3/1066* (2013.01)

(58) Field of Classification Search
CPC .... H01S 3/1062; H01S 3/08054; H01S 3/109; H01S 3/106; H01S 3/1065; H01S 3/1066; H01S 3/137; H01S 3/06791; H01S 3/0816; H01S 3/107
USPC .............................................. 372/20, 22, 19
See application file for complete search history.

(56) References Cited

U.S. PATENT DOCUMENTS 4,302,730 A * 11/1981 Jernigan ............... H01S 3/1075
372/108
5,173,908 A * 12/1992 Negus .................. H01S 3/1112
372/18
(Continued)

FOREIGN PATENT DOCUMENTS

DE 196 11 015 A1 1/1998
DE 199 11 103 A1 9/2000
(Continued)

OTHER PUBLICATIONS

German Search Report dated Oct. 5, 2015 (7 pages).
(Continued)

*Primary Examiner* — Kinam Park
(74) *Attorney, Agent, or Firm* — Flynn, Thiel, Boutell & Tanis, P.C.

(57) ABSTRACT

In a resonator arrangement (1) including a resonator (2), an interferometer (9) is arranged inside the resonator (2) and includes at least a first and a second interferometer leg (9a, 9b). The two interferometer legs (9a, 9b) have optical path lengths (L1, L2) that differ from each other. According to the invention a splitting ratio is variably adjustable, with which the interferometer (9) splits radiation (8) circulating in the resonator (2) into the first and second interferometer legs (9a, 9b).

31 Claims, 8 Drawing Sheets

(51) Int. Cl.
  *H01S 3/08* (2006.01)
  *H01S 3/137* (2006.01)
  *H01S 3/109* (2006.01)
  *H01S 3/107* (2006.01)
  *H01S 3/067* (2006.01)
  *H01S 3/081* (2006.01)
  *H01S 3/083* (2006.01)

(56) References Cited

U.S. PATENT DOCUMENTS

| | | | | |
|---|---|---|---|---|
| 5,381,427 | A * | 1/1995 | Wedekind | H01S 3/08036 372/105 |
| 5,590,148 | A * | 12/1996 | Szarmes | H01S 3/08036 372/105 |
| 6,785,303 | B1 * | 8/2004 | Holzwarth | H01S 3/1112 372/100 |
| 8,908,189 | B2 | 12/2014 | Tumlinson | |
| 2015/0071322 | A1 * | 3/2015 | Haensel | H01S 3/06791 372/107 |

FOREIGN PATENT DOCUMENTS

| | | |
|---|---|---|
| DE | 100 44 404 C2 | 4/2002 |
| EP | 1 161 782 B1 | 12/2001 |
| EP | 2 846 421 A1 | 3/2015 |
| JP | 2003-337236 A | 11/2003 |
| WO | WO 2015/139829 A1 | 9/2015 |

OTHER PUBLICATIONS

English translation of European Patent Office Search Report issued in Application No. 15 198 356.6 dated Jun. 7, 2016 (4 pages).

French, P.M.W.; Chen, G.F.; Sibbett, W.; "Tunable group velocity dispersion interferometer for intracavity and extracavity applications", Abstract only, Optics Commun., Bd. 57 No. 4, Mar. 15, 1986 (2 pages).

Japanese Office Action for corresponding Japanese Patent Application No. 2015-248420, dated Nov. 18, 2016, with English translation (8 pages).

* cited by examiner

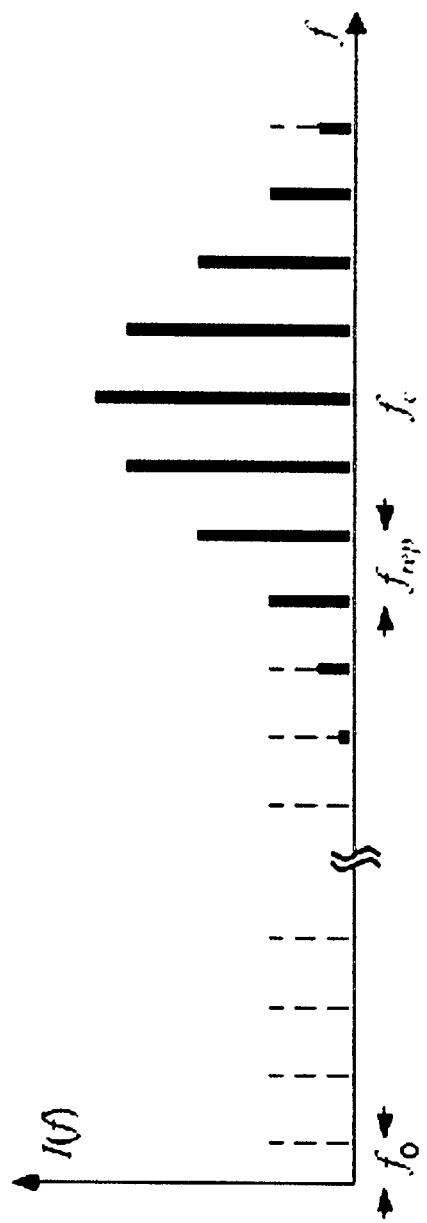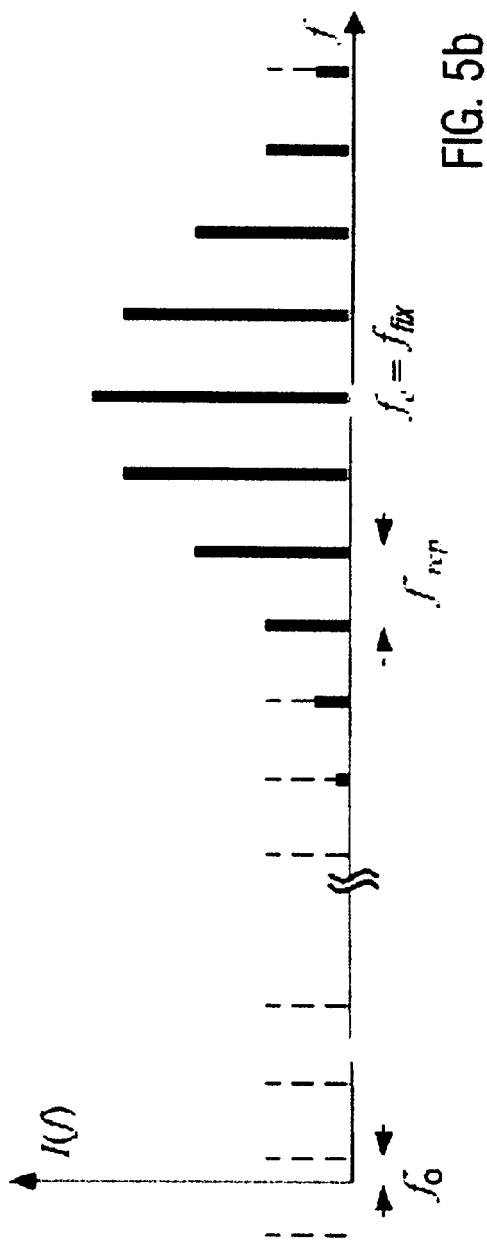

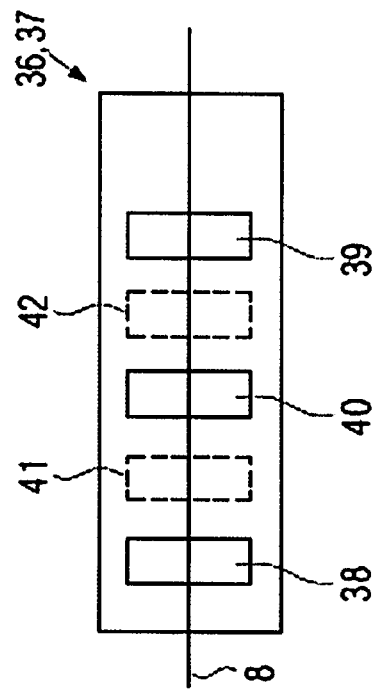
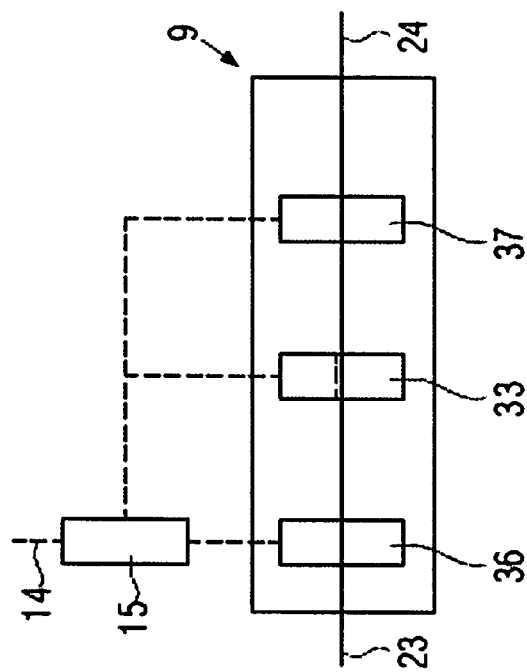

OPTICAL RESONATOR ARRANGEMENT AND A METHOD FOR ADJUSTING A ROUND-TRIP TIME IN A RESONATOR

FIELD OF THE INVENTION

The invention relates to an optical resonator arrangement with a resonator and to a method by which the position of the modes of such a resonator or a group round-trip time (and/or phase round-trip time) of optical pulses circulating in the resonator is adjusted.

BACKGROUND OF THE INVENTION

The purpose of a resonator is to provide resonant amplification for particular frequencies. Within a particular spectral region, the position of these resonances can be characterized by the absolute position of a spectral line and also by the spacing of neighboring spectral lines. Controlling the position of these resonances is of importance, in particular, in the field of short and ultra-short pulses and in frequency comb technology.

In particular, for applications using such resonators in the field of ultra-short laser pulses, the position of the resonances is often characterized by two values, the spacing of the resonance lines previously referred to, which corresponds to the pulse repetition rate of pulses circulating in such a resonator, and the so-called carrier envelope frequency, which indicates the spacing of the smallest resonance line to zero when continuing the resonances with constant spacing towards smaller frequencies. The significance of the carrier envelope frequency results from the use of such a resonator for the generation and/or filtering of regular laser pulses or of an associated frequency comb.

FIG. 1a illustrates regular laser pulses in a plot of the electric field versus time. There are shown both the envelope of the laser pulses 110 and the carrier wave 120 of the laser pulses 110. The carrier wave 120 can be represented by a sinusoidal oscillation in the range of optical frequencies.

FIG. 1b illustrates the frequency comb associated with the laser pulses 110 of FIG. 1a. This frequency comb includes a plurality of laser modes $f_m$ being spaced apart from each other by $f_{rep}$. Here $f_{rep}$ is the spacing of neighbouring modes of the frequency comb. The modes $f_m$ of the frequency comb may be expressed, as mentioned above, by the following formula:

$$f_m = m \times f_{rep} + f_0. \quad (1)$$

Here, m is a natural number. Naturally, the modes of a real frequency comb extend across a finite width in the frequency domain. The parameter $f_0$ of the frequency comb is referred to in the following as (carrier envelope) offset frequency or carrier envelope offset frequency of the frequency comb. The presence of this offset frequency $f_0$ resides in the fact that the frequencies of the laser modes $f_m$ are not necessarily multiples of each other. In order to adjust or otherwise control the modes $f_m$ of a resonator, in particular the modes of a frequency comb generator, it is advantageous if the spacing between neighbouring modes $f_{rep}$ and/or the offset frequency $f_0$ are adjustable.

DESCRIPTION OF THE PRIOR ART

DE 199 11 103 A1, EP 1 161 782 B1 and DE 100 44 404 C2 describe some methods as to how the degrees of freedom of the frequency comb, such as for instance the offset frequency $f_0$ and the mode spacing $f_{rep}$, can be set or adjusted to fixed values. A common method is to measure the offset frequency $f_0$ as one parameter by means of an appropriate apparatus, for instance by means of an f-2f-interferometer, and to measure as a second parameter, for instance, the mode spacing.

To this end, a respective stabilizer or control loop are provided. A first stabilizer relates to the mode spacing. As a measurement value for this stabilizer, the pulse repetition frequency (possibly divided into better detectable areas or multiplied) may be used that, as mentioned, corresponds to the mode spacing. An evaluation and comparison unit compares the measured value with a predetermined reference value for the pulse repetition frequency. In order to change the mode spacing or to adjust it to a predetermined reference value for a determined deviation, the stabilizer drives an actuator, which changes the optical path length of the oscillator and thus the pulse repetition frequency. For example, the actuator may be a linear drive or an electro-optic element or piezo-actuator for an resonator end mirror of the oscillator.

A second stabilizer regulates the offset frequency $f_0$ to a certain value. To this end, a certain mode $f_m$ of the frequency comb is superimposed on a detector (for instance a photo diode or a photo multiplier) with either an external exactly known reference frequency (for example from a continuous wave laser) or with a frequency-doubled mode from the same frequency comb. The superposition generates a beat frequency in the radio frequency range. An evaluation and comparison unit compares the beat frequency with a predetermined, possibly variably adjustable reference frequency. If in this case a deviation is obtained, the second stabilizer controls an actuator that changes the difference between phase and group round-trip time in the oscillator. This may be accomplished, for instance, by slightly tilting the resonator end mirror in a resonator branch that is spatially separately passed through by the modes in order to change the optical path length of the oscillator in a frequency-dependent manner. A further control option, which results in both fast response times (less than 1 micro second) and high dynamic depending on the implementation, uses the geometric phase in the development of polarization states. In particular, it allows the adjustment of the carrier envelope offset frequency without cross talking to the pulse repetition rate and/or the round-trip losses of the resonator. Alternatively, the oscillator losses may be changed, for instance, by an intensity modulator or by varying the pump power for the amplifier that may possibly be present in the oscillator, a dispersive element such as a pair of prisms such as a transparent tiltable plate may be inserted into the optical path of the oscillator and may be changed in its position, or a light guiding component, in particular a "chirped" fibre Bragg grating, may be varied by expansion or temperature.

Using the means described in DE 199 11 103 A1, EP 1 161 782 B1 or DE 100 44 404 C2, in total, a completely stabilized frequency comb is generated, whose individual modes are positioned at exactly known frequencies and are coherent to each other. Regarding a detailed description of these means, refer to the above referenced documents.

The above described technique of stabilising a resonator or frequency comb laser is only one of a plurality of possibilities. Depending on the type of application and depending on the technical possibilities, different types of stabilising are sensible. In particular, the generation of the error signals may be accomplished in several ways. Besides the measurement of the offset frequency (for example with the aid of f-to-2f interferometers) and of the repetition rate, the determination of the position of individual resonant lines, for instance by using a reference laser, is advantageous. For example, the position of the carrier frequency of a pulse laser together with the offset frequency may be used for the stabilising. In this case, it is specifically advantageous that contrary to the stabilising via the repetition rate, the noise of the reference is not transferred to the optical resonant lines in a highly multiplied manner.

In any case, for a complete stabilisation, two linearly independent error signals are required for the position of the resonant lines. For the regulation it is advantageous when the actuators may be selected such that a respective one thereof acts on one of the two error signals while leaving the other one as unaffected as possible. Although it is possible to othogonalise the error signals, for a differing quality of the error signals, however, the total quality of the stabilisation may suffer, in particular, when the actuators used have different control speeds. It is therefore advantageous to physically decouple the degrees of freedom.

For example, if a frequency comb laser is stabilized to its offset frequency (which is close to 0) and to an optical mode, for instance close to the carrier frequency $f_c$, then the first error signal consists of the position of a resonator mode in the vicinity of the carrier frequency $f_c$ and the second error signal consists of the offset frequency $f_c$. The ideal first actuator expands the position of the resonant frequency around zero so as to (substantially) not influence the offset frequency while changing the carrier frequency. The ideal second actuator expands the resonator modes around the carrier frequency $f_c$ and thus changes the offset frequency without shifting the carrier frequency. The effect of such an actuator is shown in FIG. 5. In FIG. 5a the unchanged frequency comb is shown, while FIG. 5b shows the same frequency comb after a rotation about the carrier frequency $f_c$.

Actuators that expand or contract the resonant lines about (roughly) the null frequency, that is, that adjust the pulse repetition rate without substantial cross talking on the offset frequency, are mainly movable mirrors and electro-optical phase modulators which in total allow an adjustment with large displacement and high adjusting speed. The expansion and contraction, respectively, of the resonant lines around a fixed point other than zero is more difficult to be accomplished. Although there are some among the above-listed actuators for the offset frequency, which accomplish this, the different implementations, however, have different limitations.

For example, in the prior art, it is disadvantageous that the adjusting speed of existing actuators is limited as these actuators mainly use mechanical or thermal effects. For a rapid adjustment conventionally, the modulation of the intensity in the resonator is mainly used, which reacts back on the offset frequency via the Kerr-effect. In this case, the intensity is varied by the quality factor of the resonator or the pump power. Here, it is disadvantageous that a per se undesired modulation of the intensity occurs. Moreover, it is disadvantageous that the modulation of the intensity in the resonator may be coupled with thermal effects, which in turn cause an additional slow system response and therefore impede or even prevent control. In particular, the modulation of the intensity is mainly appropriate for later resonators and is less appropriate for filter resonators or gain resonators.

Moreover, it is disadvantageous that the position of the fixed point is often not specifically controllable but implicitly depends on the components used. Finally it is disadvantageous that a plurality of actuators only have a limited range and limited sensitivity, respectively, in response to a control signal.

OBJECT OF THE INVENTION

It is the object of the present invention to implement the possibilities of varying or controlling the repetition rate, the group round-trip time of pulses circulating in a resonator and/or of the carrier offset frequency of resonator radiation in order to provide superior handling or allow faster adjustment.

This object is achieved by the present invention by an optical resonator arrangement having the claimed features or by a method having the claimed features. Advantageous embodiments of the invention are set forth in the dependent claims.

SUMMARY OF THE INVENTION

According to the present invention an interferometer having two or more interferometer legs is provided in a resonator. This interferometer splits the radiation circulating in the resonator, that is, pulses circulating in the resonator, into a first portion for one of the interferometer legs and into a second portion for a second interferometer leg (further portions may contribute if more than two interferometer legs are present). According to the present invention, the optical path lengths along the two interferometer legs are different from each other. This means that the group and/or phase round-trip times of the two radiation portions differ from each other when being recombined, i.e. interfering with each other, after passing through the interferometer. In one exemplary embodiment of the present invention, the interferometer legs are constructed such that light of a specific target frequency $f_z$ (and an associated target wavelength $\lambda_z$) with a phase $n \times 2 \times \pi$ interferes and therefore constructively superimposes.

According to the present invention a splitting ratio by which the interferometer splits radiation circulating in the resonator into the first and second interferometer legs, is adjustable in a variable manner. When changing the splitting ratio of the interferometer without concurrently changing the optical path lengths along the two interferometer legs, the interfering phase of the wave associated with the frequency $f_z$ does not change. On the other hand, the group center of a pulse circulating at the carrier frequency $f_c = f_z$ changes, i.e., after passing through the interferometer the resulting radiation in total has experienced a change in group round-trip time in the resonator upon changing the splitting ratio. Since a variation of the group round-trip time causes a change of the repetition rate (synonym: pulse repetition rate) of the resonator, the changing of the splitting ratio concurrently results in a variation of this repetition rate.

In the frequency domain (FIG. 1B) this means that the comb of frequencies $f_m$ expands around the fixed point $f_{fix} = f_z$ like an accordion, that is, the spacing between adjacent nodes increases or decreases by a uniform factor. This means that, at the same time of course, the carrier envelope offset frequency $f_0$, i.e., the so-called offset frequency of the frequency comb shown in FIG. 1B, changes. The group delay for interference from k different paths of an interferometer may be computed mathematically from the individual amplitudes of the electric field along the paths $i=1 \ldots, k$.

The invention is advantageously applicable, in particular, in the field of optical resonator arrangements and, in particular, of laser resonator arrangements. Particularly advantageously, the invention may be used for the generation or fine tuning of frequency combs as well as the adjustment of characteristics (for example the repetition rate) of short pulse or ultra-short pulse resonators. The respective laser pulses may have a pulse period in the range of picoseconds or femtoseconds. On the other hand, the invention is also well applicable for greater or even less pulse periods.

The invention allows to expand or to contract the resonant lines of a resonator around a fixed point in a dedicated manner. The position of the fixed point is freely selectable within a certain range and, in a preferred implementation, the position is in the vicinity of the carrier frequency of the laser radiation to be influenced. Here, the present invention enables both low and a particularly fast adjusting times, in particular, adjusting times of less than 1 μs. It is a particular feature that this novel method enables a substantially greater range than comparable fast repetition rate controllers so that under appropriate circumstances additional slow elements of increased range may not be required. The present invention may also replace or complement classical repetition rate controllers that expand and contract, respectively, the resonant lines around zero, if the concurrent influence on the carrier envelope offset frequency is not a problem.

A particular advantage of the present invention therefore resides in the fact that the resonant lines may be expanded and contacted, respectively, around a specifically selected fixed point, in particular, around the carrier frequency of the optical radiation. This is specifically useful for the stabilisation of a frequency comb to optical reference frequencies. In one specific embodiment the invention enables the adjustment at a specifically high control speed, in particular, in less than 1 μs. In addition, the range or the sensitivity of the fast variant is substantially greater than in conventional fast repetition rate controllers. A specifically robust implementation may be achieved by means of waveguides. Due to the large achievable signal sensitivity also an implementation with free beam elements is advantageous, in particular since in this way the insertion damping may be maintained at a low level, losses of less than 10%, 5% or 1% are typical. A further advantage of the present invention is the fact that the method may be implemented without movable parts, thereby resulting in a very compact and robust construction. In particular it is appropriate for usage in free beam lasers (solid state lasers, gas lasers or dye lasers) or generally in lasers in which the laser resonator has a relatively high quality factor.

Preferably the resonator arrangement comprises an actuator or control element for adjusting the splitting ratio of the radiation into the two interferometer legs. By means of the actuator, an automatic and thus an even faster adjustment of the splitting ratio is possible. The actuator ideally has a control bandwidth of at least 10 kHz, at least 100 kHz or at least 1000 kHz and thus enables a very fast variation of the splitting ratio of the radiation into the two interferometer legs and therefore a very fast adjustment of the round-trip time of the pulses in the resonator.

As previously mentioned, the interferometer may not only comprise two but may comprise more than two interferometer legs. Among others, this may be accomplished by interleaving a plurality of two-beam interferometers. In this case, preferably the splitting ratio is variably adjustable, according to which one of the interferometers splits the radiation circulating in the resonator into its two interferometer legs. Alternatively, at the same time, a splitting ratio may be provided for more than two interferometer legs.

Preferably, the resonator arrangement comprises a measurement apparatus configured to measure the position of the resonances, in particular to determine the repetition rate and/or the carrier envelope offset frequency of a frequency comb generated or obtained by the resonator. The signal of the measurement apparatus may be input into a controller or an evaluation unit and may be used after appropriate evaluation, for instance a comparison with a target value, for adjusting a desired repetition rate.

It is contemplated that the interferometer includes at least one birefringent optical element or even that the interferometer in total is realised by such a birefringent optical element. The different interferometer legs are then realised along the two polarization directions. This has the advantage that the two optical interferometer legs may be geometrically identical, that is, a very compact and stable resonator arrangement is obtained. Moreover, a respective birefringent optical element may be controlled very fast in order to change the splitting ratio. Instead of the birefringence effect, any other effects may be used, which result in a polarization dependent round-trip time delay and/or phase delay. For example, this is the phase delay upon reflection at non-spherical curved mirrors or the phase offset between s- and p-polarization upon reflection at non-orthogonal incident. The magnitude of the phase offset may optionally be adjustable, for example by means of the angle of reflection.

In particular, the at least one birefringent element may be an integer wave plate for a resonant carrier wave of the radiation in the resonator, i.e. an n×λ plate, n being an integer with n≥1. Such a birefringent optical element represents a very compact form of an interferometer having two legs. A first leg of the interferometer consists of the path of the extraordinary beam portion and a second leg consists of the path of the ordinary beam portion of the radiation circulating in the resonator. The integer wave plate exactly has a power such that the positive interference of the two beam portions is achieved after passing through the wave plate, namely for a certain target frequency $f_z$. In one preferred implementation, $f_z$ is selected to be in the vicinity of the carrier frequency $f_c$ of the radiation circulating in the resonator. Upon changing the splitting ratio in this interferometer, for instance by changing the incident polarization of the radiation or by rotating the integer wave plate itself, the average group round-trip delay of the radiation and thus the repetition rate of the resonator are changed. In general, the target frequency $f_z$, for which the interferometer (or a specific component of the interferometer) is resonant, is selected such that the transmission losses are compatible with the use of the resonator.

Preferably, the interferometer includes one or more of the following optical elements: a polarization filter, a polarization controller or actuator, a λ-plate, an n λ-plate with n≥2, a λ/2-plate, a λ/4-plate, an electro-optic modulator (EOM) and/or a variably adjustable liquid crystal or ferroelectric crystal. Here, the EOM or the variably adjustable liquid crystal may be used as the controllable and thus changeable birefringent element, in particular, with respect to a variation of polarization or orientation of the birefringence and associated therewith, a change of the splitting ratio between the beam portions in the different interferometer legs, for example, in the different axes of the adjustable birefringent material itself or of a further birefringent element.

Furthermore, it may be contemplated that the resonator arrangement of the present invention has a linear construction or includes a linear path so that the interferometer of the present invention is passed in both directions by the laser radiation. In this case, the interferometer may be constructed by taking advantage of a reflection so that the components may repeatedly be used and/or superior control accuracy and robustness may be achieved. Also, an advantageous usage of components as well as increased stability may be achieved by a geometric folding.

The resonators, in particular resonators having a linear path, may include, in specific embodiments, a nonlinear optical loop mirror (NOLM) or any other saturable absorber, in particular a Kerr-lens or a semiconductor-based saturable absorber.

In addition to the at least two interferometer legs of the interferometer with lengths L1 and L2, an interferometer may be present that is interleaved with this interferometer. In this manner, the transmission bandwidth around an appropriate base state and/or the bandwidth of the desired offset of resonant lines may be greater than without such an interleaved interferometer. Such an interleaved arrangement may be achieved, for instance, by using at least two birefringent optical elements, for example, wave plates, wherein the fast and slow axes, respectively, of the birefringent materials are substantially opposite to each other. For changing the splitting ratio, the orientation of the wave plates with respect to each other is changed, in particular, only one of the two wave plates may be changed in its orientation and/or the polarizations of the radiation at the two wave plates are influenced differently.

The present invention may ideally be used in the context of a resonator including a gain medium, or in the context of a so-called "cold" resonator, which does not include a gain medium or amplifier medium for the radiation coupled into the resonator.

In particular, the present invention may be advantageously used for the generation of short pulses or frequency combs. To this end, a mode coupling element, active or passive, is provided in the resonator in addition to the amplifier medium. Appropriate candidates are amplitude or phase modulators or nonlinear optical elements, such as a Kerr-element, a Kerr-lens, a nonlinear optical loop mirror and/or a semiconductor-based saturable absorber.

A resonator according to the present invention having one or more amplifying media may advantageously be used, even without a mode coupling element, in order to tune a laser resonator to one or more injection sources, for example. Such an injection source may provide individual laser frequencies but, in particular, a frequency comb-like spectrum of a plurality of components, for instance from a mode coupled laser.

In addition, a resonator according to the present invention may be used within a mode coupled laser in order to further filter the laser modes, thereby causing in this manner a harmonic mode coupling of the surrounding laser resonator.

A plurality of resonators according to the present invention may advantageously be used within a system, both in a serial arrangement and an interleaving arrangement.

Also, within one resonator, a plurality of interferometers may serially or interveningly be arranged. In particular, a plurality of control elements may be present. Advantageously, control elements may concurrently be used, which expand or contract the resonator modes around different fixed point frequencies $f_{fix}$ and $f'_{fix}$.

A resonator of the present invention may advantageously be used with or without an amplifying medium for filtering and/or amplifying radiation coupled into the resonator. The filtering may for instance be used for multiplying the pulse repetition rate of laser radiation coupled into the resonator. In one advantageous embodiment, the mode spacing of the resonator of the present invention is in this case an integer multiple of the radiation coupled into the resonator. In further embodiments, the resonator of the present invention may comprise a mode spacing having a rational splitting ratio other than 1 compared to the mode spacing of the incident radiation. In this manner, a plurality of pulses may concurrently circulate in the resonator of the present invention, wherein a filtering of the involved mode frequencies may be accomplished concurrently with the entering of a plurality of pulses. A circulation of a plurality of pulses without concurrent filtering is obtained when the splitting ratio may be written as 1/k, where k is an integer.

A resonator internal amplification is particularly sensible for driving nonlinear processes, in particular for the provision of UV and EUV light by the generation of higher harmonic frequencies in gas jets. In this case, it is disadvantageous that the resonator internal medium used for generating the higher harmonics changes its index of refraction and, in particular, its dispersion during the generation of the harmonic frequencies so intensively that the resonator is detuned with respect to the radiation coupled into the resonator. The invention proposed here enables a fast readjustment of the resonator with respect to the position of the resonance and also with respect to the spacing of the resonance. Likewise, amplification may advantageously be used for the generation of light of the 2. harmonics of the fundamental wave, for the provision of light by means of generation of sum and difference frequencies, as well as for the generation and amplification of light by means of optical parametric processes.

Moreover, the invention may be used to adapt the position of resonances of a resonator arrangement to a plurality of target resonances. For example, the position of one or two resonances may be specifically adjusted. An advantageous application may be the amplification of continuous wave lasers during the formation of the sum frequency, and also the tuning of optical parametric oscillators (OPOs). Moreover, the invention may advantageously be used for reference resonators. For example, the present invention allows a detuning in frequency with respect to each other of two lasers stabilized to a common resonator without, for instance, changing their mean value. It may be advantageous in this context to use wave plates that exhibit a phase offset of an integer multiple of $2\pi$ for the wavelengths used, for example $2\times 2\pi$ for a first wavelength and $3\times 2\pi$ for a second wavelength.

In addition, the present invention also relates to a method for adjusting a repetition rate of the resonator or a group round-trip time and/or a phase round-trip time of pulses circulating in a resonator. The adjustment of the group round-trip time is equivalent with the adjustment of a repetition rate of the resonator. The method of the present invention is characterised in that an interferometer having two or more legs is arranged in the resonator and that a splitting ratio is varied or specifically adjusted, with which the interferometer splits the pulses circulating in the resonator into two different pulse portions. In this manner the advantages set forth above are obtained.

The method may appropriately include the usage of one or more of the above-identified structural features or features set forth in the context of the drawings.

If desired, the present invention enables, upon the changing or varying the splitting ratio into the different interferometer legs, a variation of the group round-trip time of pulses circulating in the resonator without concurrently changing the phase round-trip time of the carrier wave in the resonator. This allows that during a variation of the group round-trip time (i.e. the repetition rate), a magnitude of a certain in frequency $f_{fix}$ around the carrier frequency $f_c$ is maintained exactly constant, i.e., the modes of the frequency comb generated by the resonator are shifted exactly like this constant frequency in an accordion-like or fan-like manner away from each other (or towards each other). This is particularly advantageous when a stabilisation of the resonator occurs at this constant frequency $f_{fix}$ or at a closely adjacent frequency.

On the other hand, it is also possible to change simultaneously the group round-trip time of pulses and the phase round-trip time of the carrier wave, if the splitting ratio of the radiation into the two interferometer legs is varied. Such an effect may, for instance, be accomplished by an additional phase shift, which may, for instance, occur during the adjustment of the splitting ratio. Within a certain range this may also be accomplished by selecting the resonant frequency $f_z$ in the interferometer to differ from the carrier frequency $f_c$. In the frequency domain this means that the fixed point about which the frequency comb expands (or contracts) in a fan like manner does not coincide with the carrier frequency of the pulse. In particular, the fixed point frequency $f_{fix}$ may lie outside of the spectrum circulating in the resonator.

It is beneficial if the round-trip losses of the pulses circulating in the resonator ideally do not change at all or change only insignificantly, for instance less than 1%, 5%, 10% or at most 20%, upon varying the splitting ratio with which the interferometer splits the pulses circulating in the resonator into the first and second pulse portions. In this manner, the average power of the radiation exiting the resonator is independent from a variation of the repetition rate and a round-trip time, respectively. This reduces the generation of intensity variations upon adjusting the repetition rate, which in particular cause undesired cross-talking onto further laser parameters, in particular for active resonators. The above-identified percentages relate to a variation of the pulse repetition rate $f_{rep}$ by $f_{rep}/m$, where m is the longitudinal mode number in the resonator according to equation (1), or relate to a variation of the carrier envelope offset frequency $f_0$ according to the mode spacing $f_{rep}$. For smaller variations of the pulse repetition rate the change in transmission decreases accordingly.

The interferometer for polarized radiation in the resonator may be realised and adjusted in a convenient manner, if at least one integer wave plate for a target wavelength $\lambda_z$ of the pulses circulating in the resonator is used as the interferometer and is rotated around an optical axis of the resonator for adjusting the splitting ratio. Alternatively, the polarization incident at the wave plate may be rotated or may be changed in its degree of ellipticity.

In typical applications of this type, the polarization is fixed at least at one position in the resonator, for example by a polarization selective element, in particular a polarization filter or pole beam splitter. Optical elements, which change the polarization that is present at the interferometer entrance, are provided in the resonator. It is also contemplated that only the interferometer is located in the resonator and the polarization is set by external circumstances, for instance by radiation coupled into the resonator. It has already been set forth that in the interferometer a splitting into more than two pulse portions into a corresponding number, i.e., more than two, of interferometer legs may be applied, and that a splitting ratio may be variably adjusted according to the interferometer splitting of the pulses circulating in the resonator into two or more of these interferometer legs.

It may be particularly useful for the present invention, if the constant frequency $f_{fix}$ is at least one 1.1 times the carrier frequency $f_c$, i.e., $f_{fix} > 1.1 f_c$. It may also be useful when the constant frequency $f_{fix}$ is greater than one 10th and is concurrently less than 0.9 times the carrier frequency insert, that is, $0.1 f_c < f_{fix} < 0.9 f_c$.

BRIEF DESCRIPTION OF THE DRAWINGS

In the following, advantageous embodiments of the present invention are illustrated in more detail by referring to the drawings. In particular in the drawings:

FIG. 5a shows a frequency comb corresponding to FIG. 1b having a repetition rate $f_{rep}$, FIG. 5b illustrates a second frequency comb having a changed repetition rate insert, FIG. 9 shows a forth embodiment of an interferometer, FIG. 10 illustrates an embodiment of a polarization actuator and FIG. 11 illustrates an embodiment of a filter resonator or gain resonator.

DETAILED DESCRIPTION OF THE INVENTION

Throughout the figures like components are denoted by the same reference signs.

Figure 1:
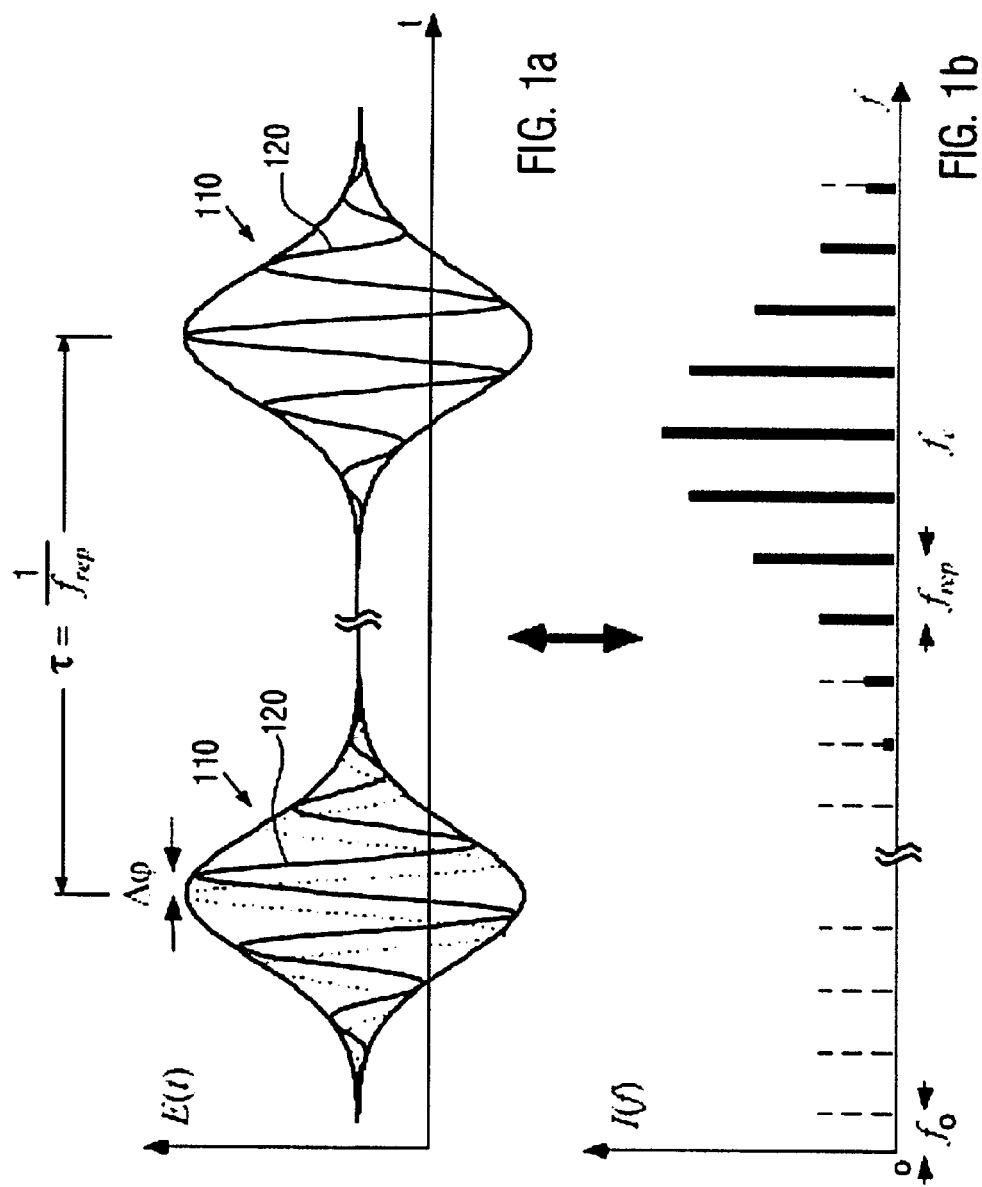
FIG. 1a shows two subsequent laser pulses of a burst of pulses and the carrier wave associated therewith, wherein the horizontal axis represents the time and the vertical axis represents the electric field.
FIG. 1b illustrates the frequency comb associated with the laser pulses of FIG. 1a, wherein the horizontal axis represents the frequency and the vertical axis represents the intensity of the respective frequency.
Figure 2:
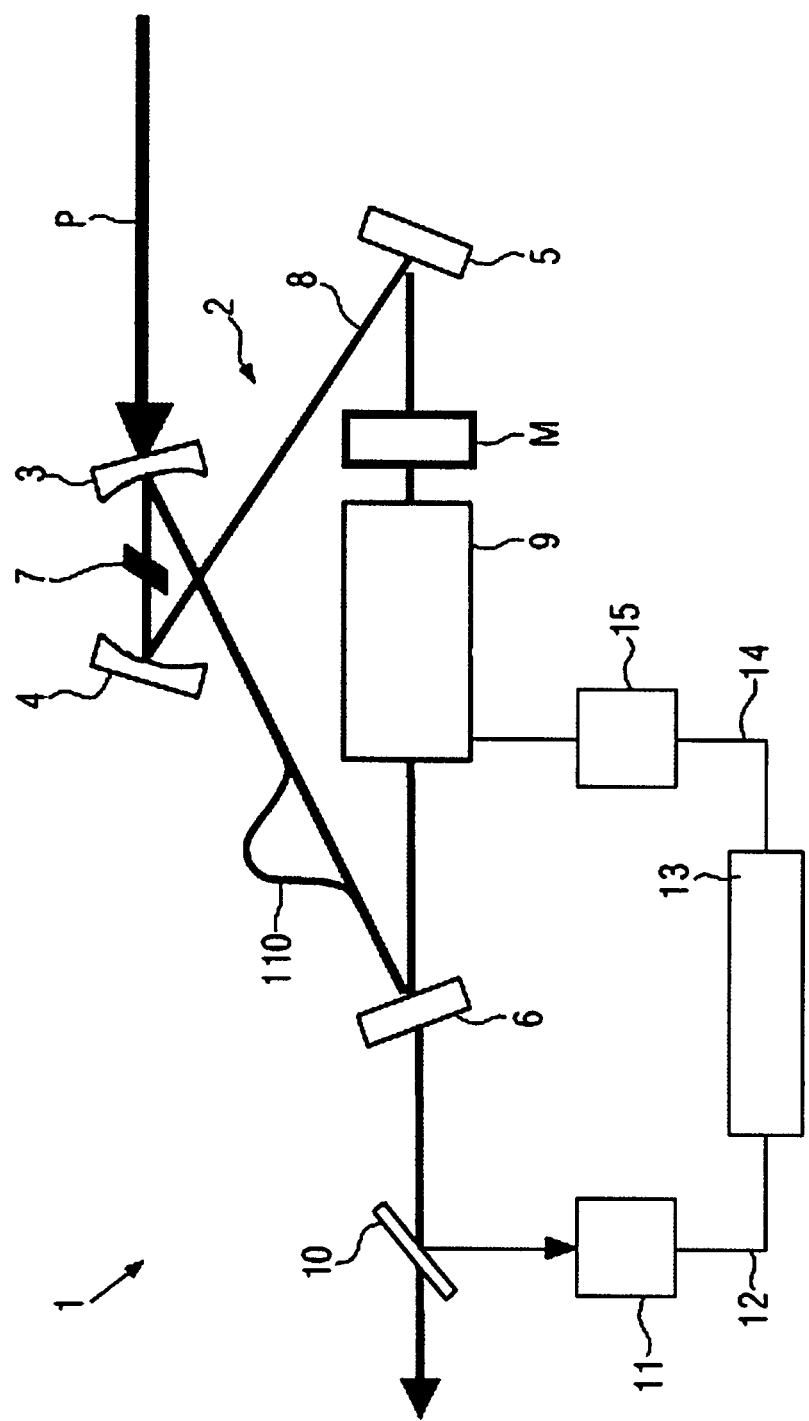
FIG. 2 illustrates a first embodiment of the resonator arrangement including a ring resonator.

FIG. 2 schematically shows a resonator arrangement 1 according to the present invention comprising a resonator 2 configured here as a ring resonator. The resonator 2 comprises two curved mirrors 3, 4 as well as two planar deflection mirrors 5, 6. A laser medium 7, e.g. a laser crystal such as Ti:Sa, is arranged between the two curved mirrors 3, 4, in particular, at the location of the focus defined by the concave curvature of the two mirrors 3, 4. One of the curved mirrors 3 is semi-transparent and is thus used as an incoupling mirror for coupling pump light P into the resonator 2. One of the planar mirrors 6 is also semi-transparent to the radiation 8 circulating on the folded axis of the resonator 2 and is thus used as an outcoupling mirror for coupling the laser radiation out from the resonator 2. The radiation 8 circulates in the resonator 2 in the form of one or a plurality of exemplarily shown pulses 110 (cf. also FIG. 1a). Through the optical path length between the mirrors 3 to 6, the resonator is configured for being resonant to the carrier wave 120 having the frequency $f_c$.

In the interior of the ring resonator 2, an interferometer 9 is provided. The configuration of this interferometer and its importance for the present invention will be explained in more detail hereinbelow. In addition, the resonator 2 comprises, according to this embodiment, a mode coupler M, e.g. a Kerr-lens mode coupler (KLM), a semiconductor-based saturable absorber or a nonlinear optical loop.

Outside the resonator 2, the resonator arrangement 1 comprises, in the optical path of the radiation 8, a beam splitter 10, which directs a portion of the laser radiation 8 onto a measuring apparatus 11. The measuring apparatus 11 is configured to detect one or a plurality of the characteristics of the radiation 8 leaving the resonator 2, e.g., the pulse repetition frequency or (synonymous) repetition rate at which laser pulses 110 leave the resonator 2, the precise position of a specific mode $f_c$ of a frequency comb leaving the resonator 2 and/or a (mean) output power of the resonator 2.

For this purpose, the measuring apparatus 11 may also comprise a suitable group consisting of a plurality of measuring means or sensors, e.g. a photodiode.

Via a data line 12, a measuring signal is transmitted from the measuring apparatus 11 to an evaluation and control unit 13, which may, e.g., be a control electronics, a computer or a CPU. The evaluation and control unit is suitably configured and/or programmed for generating information from the measuring signal and for determining deviations of the measuring signal from predetermined, possibly programmable target and threshold values. The evaluation and control unit subsequently accesses, via a suitable control line 14, an actuator or control element 15 that acts on the interferometer 9. The actuator 15 is configured for changing or adjusting the splitting ratio at which the radiation 8 circulating in the resonator 2 is distributed to various legs of the interferometer 9.

Figure 3:
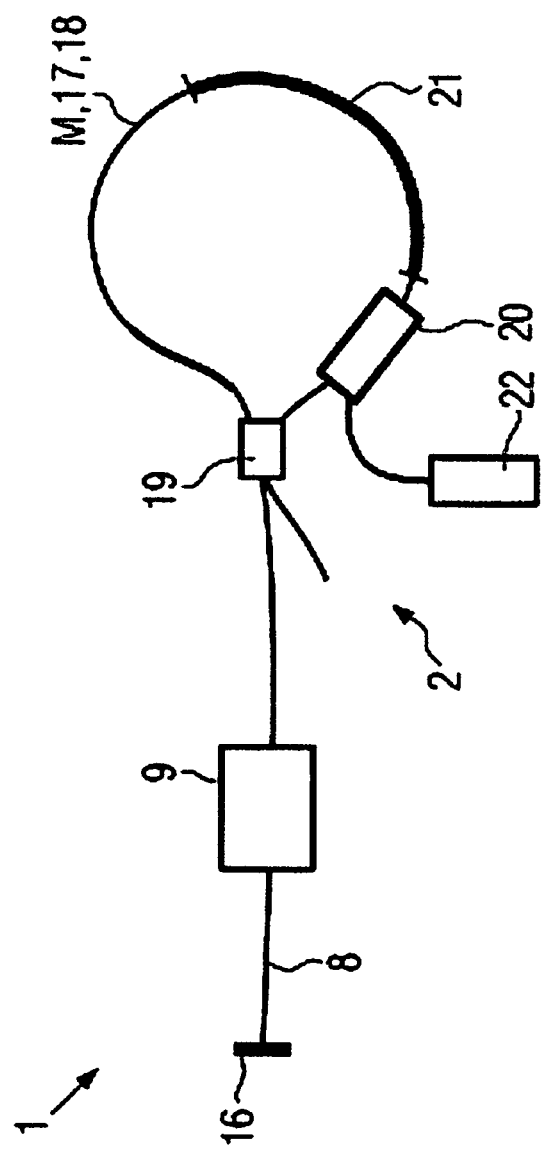
FIG. 3 is a second embodiment of the resonator arrangement including a linear resonator.

FIG. 3 shows a second embodiment of a resonator arrangement 1 comprising, in this case, a "linear resonator 2". One of the resonator end mirrors is a planar mirror 16. This mirror 16 may be configured as a semi-transparent outcoupling mirror of the resonator 2. The other resonator end mirror, however, is, in this embodiment, a mode coupler M in the form of a nonlinear optical loop mirror (Nonlinear Optical Loop Mirror, NOLM) 17, which is here configured as an amplifying loop mirror (Nonlinear Amplifying Optical Loop Mirror, NALM). The NALM includes an optical fiber 18 whose two ends are united in a beam splitter or coupler 19. The coupler 19 couples the NALM to a linear part of the resonator 2. In the NALM, i.e., in the loop mirror 17, an amplifying section 21, i.e. an area of the fiber 18 doped with suitable impurity atoms, is provided, said doped area being excited via a pump coupler 20 through an optical pump light source 22. The linear part of the resonator, i.e., the part between the planar end mirror 16 and the loop mirror 17, has arranged therein an interferometer 9 according to the present invention.

Instead of the amplifying nonlinear loop mirror 17, the linear resonator 2 of FIG. 3 may also comprise a further planar end mirror or some other kind of optical back reflection element, e.g., a Bragg grating, a fiber Bragg grating or a possibly non-amplifying, optical linear or nonlinear loop mirror. In addition, the path of the radiation 8 between the two resonator end mirrors 16, 17 may be folded, e.g. V-, Z- or W-shaped, so as to obtain a more compact resonator arrangement 1. Also, such folded resonator arrangements are regarded as "linear resonators" within the meaning of the present invention as long as radiation propagates in the so-called linear section in both directions, i.e., back and forth.

At this point, reference should be made to the fact that any form of the resonator arrangement 1 according to the present invention may optionally be provided with an active laser medium 7 (as exemplarily shown in FIGS. 2 and 3) or may not be provided with an active laser medium, i.e. it may be configured as a "cold" resonator.

The resonator arrangement 1 according to FIG. 3 comprises, just like the embodiment according to FIG. 2, the elements 10 to 15, i.e. a beam splitter 10, a measuring apparatus 11, an evaluation and control unit 13, data and control lines 12, 14 as well as an actuator or control element 15 configured for adjusting and changing the splitting ratio at which the radiation 8 is distributed into two or more legs of the interferometer 9. It is only for the sake of clarity that these components are not shown in FIG. 3.

Figure 4:
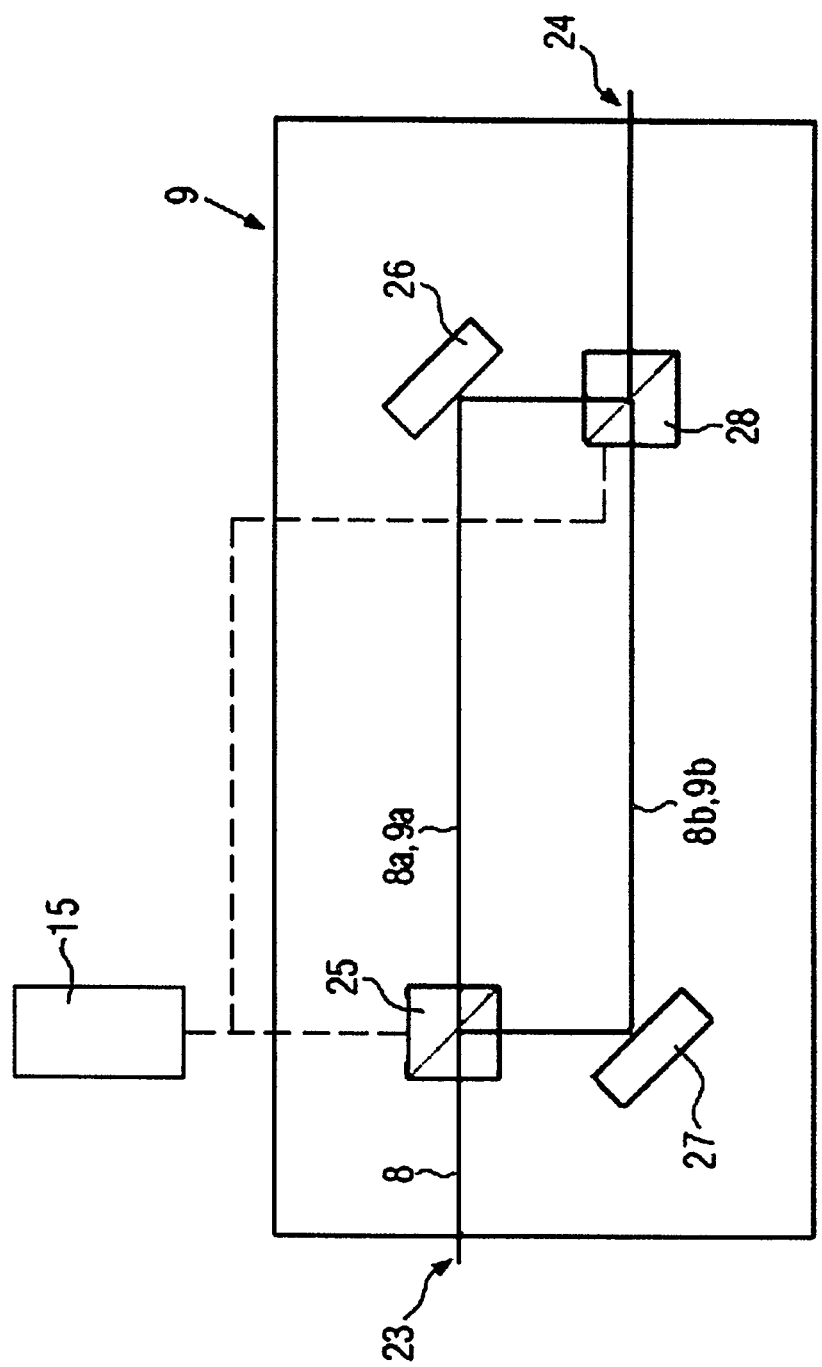
FIG. 4 is a schematic illustration of an interferometer in the resonator arrangement.

FIG. 4 shows in the form of a schematic diagram a first embodiment of an interferometer 9 in the resonator arrangement 1 according to the present invention. The radiation 8 enters the interferometer 9 at an inlet 23, whereas the radiation leaves the interferometer 9 at an outlet 24. The interferometer 9 additionally comprises a first beam splitter 25 splitting the incident radiation 8 into a first portion 8a along a first interferometer leg 9a and a second beam portion 8b passing through a second interferometer leg 9b.

A mirror 26, 27 is provided in each of the two interferometer legs 9a, 9b. It directs the radiation 8a, 8b in the respective interferometer legs 9a, 9b onto a second beam splitter 28 at which the radiation or pulse portions 8a, 8b from the two interferometer legs 9a, 9b interfere with each other before the light leaves the interferometer 9 at the outlet 24.

An important aspect for the present invention is that the first interferometer leg 9a has an optical path length $L_g1$ that is different from the optical path length $L_g2$ of the second interferometer leg 9b. Each of the optical path lengths $L_g1$, $L_g2$ is here defined as the integral over the product of the geometric length and the refraction index for the respective interferometer legs 9a and 9b. Within the framework of the present invention, it is important to differentiate between group velocity and phase velocity, and the optical path length can therefore be indicated for the group center of a pulse (index "g") as well as for the phase of the carrier wave (index "ph"). When calculating the integral, the respective refraction indices take effect. What is important for the present invention is, first of all, the diversity of the group wavelengths along the interferometer legs. Even if the geometric path length is identical, as shown in FIG. 4, the optical path lengths $L_g1$, $L_g2$ may differ from each other, if one of the two interferometer legs 9a, 9b has provided therein, at least sectionwise, a material whose index of refraction differs from that of the material provided in the other interferometer leg 9a, 9b.

A configuration which is not mandatory but definitely advantageous for various cases of use is of such a nature that the magnitude of the difference between the two optical (phase) path lengths $L_{ph}1$, $L_{ph}2$ corresponds precisely to the wavelength λ or to an integer multiple, n×λ, of a carrier wave 120 with which the resonator is operated. The optical path lengths $L_{ph}1$, $L_{ph}2$ on the two interferometer legs 9a, 9b are preferably constant during operation of the resonator arrangement 1.

According to the present invention, the splitting ratio, with which the first beam splitter 25 splits the incoming radiation 8 into a first beam portion 8a and a second beam portion 8b, is variably adjustable, each of said beam portions 8a, 8b passing then through the interferometer 9 along a respective one of the two interferometer legs 9a, 9b. The portion 8a in the first interferometer leg 9a is here continuously variable, e.g. between 0% and 100%, but may also be adjusted within smaller ranges, such as from 0% to 1%, 0% to 5% or from 47% to 53% or 40% to 60%. An expedient selection orients itself according to the range to be achieved in the change of the group round-trip time as well as according to the desired optical bandwidth of the interferometer. Shorter pulses typically need a larger bandwidth. The complementary, second beam portion 8b is then transmitted from the beam splitter 25 into the second interferometer leg 9b. In the case of a very simple embodiment, the splitting ratio can be changed by manually adjusting the beam splitter 25. According to a more convenient embodiment, an actuator or control element 15 is provided, as shown in FIGS. 2 and 3, which is capable of acting on the beam splitter 25 and/or the beam splitter 28 automatically, i.e., without any additional action on the part of a user, so as to change the splitting ratio with respect to the two interferometer legs 9a, 9b.

For the special case in which the magnitude of the path length difference $L_{ph}1-L_{ph}2$ between the two interferometer legs 9a, 9b corresponds to an integer multiple, $n \times \lambda_c$, with $n \geq 1$, of a carrier frequency $f_c$ resonant in the resonator 2, FIGS. 5a and 5b show what the invention is able to accomplish. FIG. 5a shows here again the same frequency comb that has already been shown in FIG. 1b with a spacing $f_{rep}$ between neighboring, overall equidistant modes that corresponds to the pulse repetition rate (repetition rate) of the resonator 2 and a carrier-envelope-offset frequency (CEO frequency) $f_o$. The frequency comb reaches its intensity maximum at the frequency $f_c$. In the variant schematically shown here, the interferometer 9 is adjusted such that the carrier having the frequency $f_c$ (and the wavelength $\lambda_c=c/f_c$) positively interferes at the outlet of the interferometer 9. FIG. 5a is obtained e.g. in the case of a splitting ratio $A=a:b$, where a stands for the portion of the radiation in the first interferometer leg 9a, whereas b stands for the portion of radiation in the second interferometer leg 9b.

In the case discussed here, the optical path length $L_g1$ in the first interferometer leg 9a is less than the optical path length $L_g2$ in the second interferometer leg 9b. In the method according to the present invention, i.e. when the resonator arrangement 1 is in operation, the splitting ratio A is now changed, e.g. such that a second splitting ratio $A'=a':b'=(a+x):(b-x)$ is obtained. In other words, the beam splitter 25 is modified manually or automatically by the actuator 15 such that a larger portion of the radiation 8 is transmitted to the first, "shorter" interferometer leg 9a. Here, the two optical path lengths $L_g1$, $L_g2$ remain constant, so that the light still positively interferes at the outlet of the interferometer 9, but the change in the splitting ratio has the effect that a larger portion of the radiation 8 will have a shorter group round-trip time in the resonator 2 than before. It follows that the mean group round-trip time of the radiation 8 in the resonator 2 will decrease and the repetition rate of the resonator 2 will consequently increase such that a new, larger value $f'_{rep}$ is obtained. This can be seen in FIG. 5b that illustrates the resulting frequency comb having the new mode spacing $f'_{rep}$.

At the fixed point, i.e. the resonant frequency $f_c$, the intensity maximum of the frequency comb still occurs, and the resonance point $f_c$ has not been shifted. However, around this fixed point $f_c$, the other modes have been "spread" in a fan-shaped or concertina-like manner. This also had the effect that the offset frequency $f_0$ changed. In the present embodiment, the repetition rate of the resonator 2 was even changed to such an extent that the former offset frequency $f_0$ was so to speak shifted beyond the zero line, so that a new line of the resonator now defines the new offset frequency $f'_0$.

It goes without saying that the resonator arrangement 1 works in a corresponding manner in the reverse direction. If, starting from the splitting ratio A (cf. FIG. 5a), a larger portion of the circulating radiation 8 were transmitted to the second, "longer" interferometer leg 9b, the mean group round-trip time would increase, so that, starting from FIG. 5a, the repetition rate $f_{rep}$ would therefore decrease. The frequency comb contracts so to speak around the fixed point $f_c$.

Also contemplated may be configurations, in the case of which the resonator 2, after a change of the splitting ratio, is no longer resonant for the carrier frequency $f_c$, but for a new resonant frequency. In this case, the whole frequency comb would spread or contract around a fixed point $f_{fix}$ that is different from the carrier frequency $f_c$.

Figure 6:
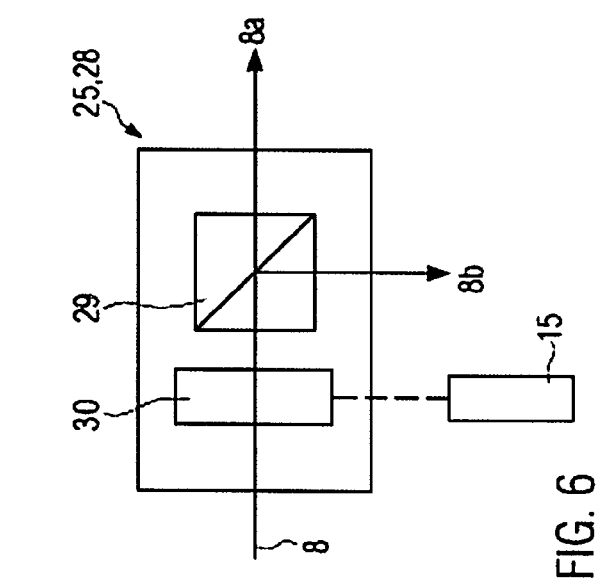
FIG. 6 illustrates an embodiment of the splitting actuator of the interferometer.

FIG. 6 shows a first possibility of macroscopically realizing the interferometer 9, and in particular, the beam splitters thereof. Each of the two beam splitters 25, 28 according to FIG. 4 is here configured as a combination of a polarization beam splitter 29 and a polarization beam splitter 30. The polarization beam splitter 30 may be a birefringent element, more specifically a rotatable half wave plate 30, which, controlled by the actuator 15, can be rotated. A change in the rotational position of the half wave plate 30 causes a change of the splitting ratio of the incident radiation 8 with respect to the two beam portions 8a, 8b for the two interferometer legs 9a, 9b.

Figure 7:
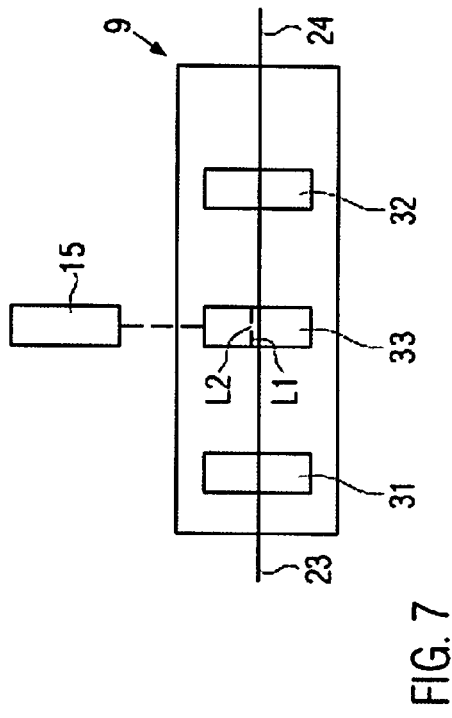
FIG. 7 shows a second embodiment of an interferometer.

FIG. 7 shows a second embodiment of an interferometer, which is much more robust than the first variant. Also, the interferometer 9 according to FIG. 7 has an inlet 23 and an outlet 24 having provided between them a first and a second polarizer 31, 32 and between these polarizers a birefringent element 33, which is here an integer wave plate with $n \times \lambda$, where $n \geq 1$, with a variably adjustable orientation. The polarizers 31, 32 are optional in the case of this embodiment, since, when used in the resonator 2, some other polarizing or polarization-selective element is typically already present. In addition, the polarization can be predetermined from outside in some cases, e.g. through the polarization of an incoupled radiation. The advantage of a polarizing element within the resonator is to be seen in that a double mode state of the resonator and the polarization mode splitting that may result therefrom can be avoided.

The $n\lambda$ wave plate 33 splits at its surface the incoming radiation 8 into a first beam portion 8a along the ordinary axis and into a second beam portion 8b along the extraordinary axis of the birefringent crystal. At the exit face of the wave plate 33, the two beam portions 8a, 8b are again positively superimposed, the path lengths difference $L_{ph}1-L_{ph}2$ being an integer multiple of a wavelength of the fixed point frequency $f_{fix}$. The two paths of the ordinary and extraordinary beam portions 8a, 8b are here geometrically superimposed, i.e., they are geometrically identical. They, however, differ from one another with respect to their index of refraction and consequently with respect to their optical path lengths L2, L2. This is schematically indicated in FIG. 7. The two legs 9a, 9b of the interferometer 9 thus extend in the axial direction of the resonator 2 between the two surfaces of the birefringent element 33.

A change in the splitting ratio and consequently in the mean group round-trip velocity and thus finally in the repetition rate of the resonator 2, is accomplished by rotating the wave plate 33. When the embodiment comprises an actuator 15, the latter may thus act on the wave plate 33 in the form of a rotary actuator.

The greater the difference between the two interferometer legs 9a, 9b is, i.e., the greater the magnitude of the difference $L_{ph}1-L_{ph}2$ is, the higher the dependence of the mean group round-trip delay on the splitting ratio of the two beam portions 8a, 8b will be. It follows that, in the case of the implementation through a wave plate 33, a higher order n of the wave plate 33 allows the achievement of a higher angular sensitivity, i.e. a greater change in the repetition rate of the resonator 2 on the basis of the same rotation of the wave plate 33. The highest angular sensitivity is achieved around the angles +/−45°, i.e., when the beam portions in both interferometer legs are approximately identical. However, an excessively high order n of the integer nλ wave plate will also lead to a high wavelength dependency of the transmission and/or of the intended line shift, whereby the bandwidth of the resonator arrangement 1 will be limited.

Figure 8:
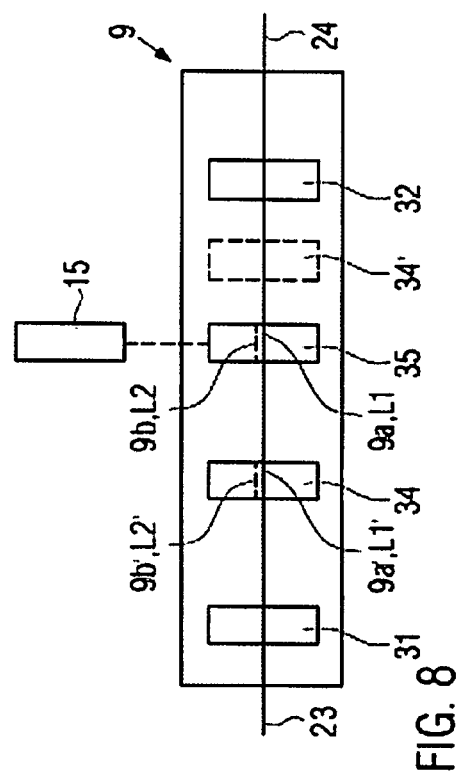
FIG. 8 shows a third embodiment of an interferometer.

FIG. 8 shows an alternative embodiment of the interferometer 9. The single birefringent element has here been replaced by two birefringent elements 34, 35, which are again arranged between the (optional) polarizers 31, 32. Each of the two birefringent elements 34, 35 consists of an integer wave plate 34, 35 for the same wavelength $\lambda_z$ of the resonant frequency $f_z$. According to a preferred variant, the wave plates 34, 35 have orders n and n' which do not differ from one another or which differ from one another only to a minor extent (e.g. |n−n'|=0). Again, according to a preferred variant, these wave plates are oriented relative to one another such that they are substantially opposed to one another, i.e. arranged at an angle of approx. 90° to one another. At least one of the two wave plates, e.g. the second wave plate 35, has a variable orientation, and the incident polarization is, expediently, at approx. 45° to the optical axes of the wave plates. In this arrangement, the adjustable birefringent element 35 is used like the element 33 in FIG. 7, whereas the fixed birefringent element 34 compensates the double refraction of the adjustable element 35 at the normal position of the latter. In this way, a high optical transmission bandwidth of the arrangement is achieved.

In a more complex representation, the arrangement schematically shown in FIG. 8 can be described as a four-leg interferometer. The path lengths L1+L1', L1+L2', L2+L1' and L2+L2' of this four-leg interferometer having the legs 9aa', 9ab', 9ba' and 9bb', which are also here geometrically identical, are shown in FIG. 8. For the sake of clarity, the components of the second interferometer legs 9b, 9b' are shown slightly displaced to the side relative to the components of the first interferometer legs 9a, 9a'. In contrast to the variant according to FIG. 7, the embodiment of the interferometer 9 according to FIG. 8 has the advantage that, at the rotation-sensitive normal position, all beam portions are guided in the two interferometer legs with lengths L1+L2' and L2+L1', respectively. In the case of a small difference between the wave plate orders n and n', in particular for n=n', this means that the transmission of the interferometer 9 is not wavelength dependent or that the wavelength-dependent losses are less than without the compensating wave plate. If there is a deviation from the normal position, small intensity components additionally contribute in the other two legs, whereas the portion in the original legs remains unchanged in the first order. This has the effect that, even for small angular deflections of the wave plates relative to one another, especially for angles that are less than 10° or less than 1°, the wavelength-dependent losses are less than without the compensating wave plate. The selection of the order n' and the orientation of the axis of the compensating wave plate also allow an adjustment of the broadbandedness of the transmission and/or of the targeted resonance line detuning. The compensation in its entirety has the effect that a high bandwidth is maintained, even if a comparatively high order of the individual wave plates should be chosen, e.g. n=n'=5. In particular, it is thus possible to accomplish a high control sensitivity of the carrier-envelope-offset frequency $f_o$, without substantially influencing the spectral optical bandwidth of the interferometer and thus the spectral width of the frequency comb generated or received by the resonator.

The compensation also makes sense in the event that the frequency $f_z$, for which the interferometer is adjusted to be resonant, lies outside the frequency range of the circulating radiation. For a target frequency $f_z$ close to the carrier frequency $f_c$, a fixed point frequency $f_{fix} \approx f_z$ is obtained like in the case of the arrangement having no compensating wave plate. If the target frequency $f_z$ is chosen such that it is clearly different from $f_c$, the compensated setup exhibits the tendency that the fixed point $f_{fix}$ no longer coincides with the target frequency $f_z$. In the preferred variant described here, $f_{fix}$ is shifted away from $f_c$ relative to $f_z$. This means that the target frequency $f_z$, for which the interferometer is adjusted to be resonant, can be chosen closer to $f_c$ than an aimed-at fixed point frequency $f_{fix}$. It will here be expedient to choose the target frequency $f_z$ close enough to the carrier frequency $f_c$ for making the transmission losses compatible with the desired case of use. Hence, a suitably chosen target frequency $f_z$ provides a large range for adjusting the fixed point frequency $f_{fix}$.

The arrangement shown in FIG. 8 can be modified in an evident manner, e.g. insofar as the compensation of the double refraction of the element 35 is achieved not only by one further birefringent element 34, but by a plurality of birefringent elements, e.g. by two birefringent elements in a symmetric mode of arrangement before and behind the element 35. The birefringent element 34', which is only provided in this modified symmetric version, is shown by a broken line in FIG. 8. Furthermore, not only the orientation of the wave plate 34 or the circulating radiation polarization existing at the wave plate 34 may be adjustable but also the orientation of the additional birefringent elements or the respective circulating radiation polarization existing there.

FIG. 9 shows an alternative or extended embodiment of a rotatable wave plate (e.g. 33, 35) of the interferometer 9 in FIGS. 7 and 8. This wave plate 33 may now have either a fixed orientation, e.g. at 45°, or, as before, a variable orientation. The arrangement comprises a first and a second polarization adjuster 36, 37 arranged around the birefringent element 33. The two polarization adjusters 36, 37 and/or the wave plate 33 are accessible by the actuator 15 and can variably be adjusted thereby. The polarization adjuster 36, 37 may here especially be adjusted, e.g. rotated, for changing the polarization of the radiation 8 arriving at the wave plate 33. To this end, the polarization adjusters 36, 37 may be realized, e.g., as an adjustable half wave plate, as a combination of wave plates and of an electro-optical modulator, a Faraday rotator, a liquid crystal element or with ferroelectric crystals. In FIG. 9 again it is indicated that the two interferometer legs 9a, 9b are located between the two surfaces of the birefringent elements 33 and are positioned geometrically above each other. Again the offset between the two interferometer legs 9a, 9b in FIG. 9 is introduced for superior intelligibility only. Depending on the targeted range, one of the two polarization adjusters may be omitted or may be replaced with a polarizer.

FIG. 10 illustrates how each of the polarization adjusters 36, 37 is constructed in detail. Specifically, each of the polarization adjusters 36, 37 includes a first λ/4 plate 38 and a second λ/4 plate 39, where λ is preferably the wavelength $\lambda_c$ of the circulating radiation. A variably adjustable phase shifter 40 is positioned between the two λ/4 plates 38, 39, for instance an adjustable birefringent element, such as an electro-optic modulator (EOM), a controllable liquid crystal, a ferroelectric crystal and/or a thermally adjustable or pressure adjustable or strain adjustable birefringent element. It may be contemplated to influence the birefringence thermally and electrically at the same time. In particular, two or more crystals may be used, ideally having axes rotated by 90° with respect to each other in order to adjust the birefringence. In this case, the thermal adjustment may also be accomplished by a temperature difference between the two or more crystals.

Depending on the type of the phase shifter 40 used, additional global phase delays and group delays may occur here, which superimpose onto the remaining effects. They may be used for a specific adjustment of the high-frequency fixed point $f_{fix}$. For example, in an electro-optical crystal, the magnitude of the stress dependent global phase or group delay may be affected by the alignment of the crystal axes and the electric fields with respect to the optical beam. It may be advantageous for the polarization adjusters 36, 37 to use a common element, for instance by folding and/or reflection of the optical path.

It is illustrated in the dashed lines that a $\lambda/2$ plate 41, 42 for a specific target wavelength, preferably $\lambda_c$, is optionally inserted between the first $\lambda/4$ plate 38 and the phase shifter 40 and/or between the second $\lambda/4$ plate 39 and the phase shifter 40. By rotating this $\lambda/2$ plate 41, 42, the orientation of the birefringence is varied at a point at which the radiation is circularly polarized. In this way, the phase of the radiation 8 may thus be varied without concurrently causing a group delay $\Delta\phi_g$.

It is a particular feature of the present invention that it is possible to initiate the group delay with a type of optical leverage effect, which may advantageously be used, for instance, when using electro-optic modulators. In order to change the round-trip time by one optical period $T_c=1/f_c$ in a resonator 2 the optical path in the resonator 2 has to be varied by one wavelength. This variation corresponds to a phase shift of $2\pi$ in the free beam domain, which may be caused, for instance, by means of a movable mirror or by means of an electro-optic phase modulator, for which typically the group delay is approximately equal to the phase delay. According to the present invention, the optical path length is used instead of a direct change of the path by blending over between two parts of an interferometer 9. For example, the blend-over process may be accomplished by adjusting the polarization angle $\theta$ in front of a polarization beam splitter or in front of a birefringent element. For a difference in path of the interferometer legs 9a, 9b of $|L_{g1}-L_{g2}|=n*\lambda$, the change in the optical path length is $\Delta L_g=n*\lambda/2*\cos(2\theta)=)n*\lambda/2*\sin(2(\theta-45°))$. The change in path length $\Delta L_g$ is equivalent to a differential group delay of the pulses 110 of $\Delta\phi_g=2\pi/\lambda*L_g$. If a change of the phase shift $\Delta\phi$ between two polarization directions is used for rotating the polarization according to FIG. 10, then one obtains a rotation of polarization of $\Delta\theta=\Delta\phi/2$, which in turn causes a change of the optical path length of $\Delta L_g=n*\lambda/2*\sin(\Delta\phi)$ and which becomes a linear dependency $\Delta L_g=n*\lambda*\Delta\phi/2$ for small $\Delta\phi$. Compared to a direct variation of the path length with $\Delta L_g=\lambda*\Delta\phi/(2\pi)$, here one obtains a magnification of the effect of $n*\pi$. This advantage also holds true when the arrangement is used as actuator for the carrier envelope frequency.

Of particular interest are realizations of the interferometer 9, in which a variation of the group round-trip time is achieved without a concurrent, or at least without a significant, influence on the transmission of the interferometer 9. In all the previously explained embodiments, there is no or substantially no influence on the transmission of the carrier frequency $f_c$ upon a variation of the splitting ratio and thus of the mean group delay of the pulses 110. Depending on the adaptation of the bandwidth of the interferometer, also the variation of the transmission with respect to the entire circulating light may be maintained at a low or negligible level.

However, additional arrangements may be contemplated, in which the transmission of the interferometer is not constant. Such a situation may be encountered, when the path difference between the interferometer legs is not an integer multiple of a carrier wave $\lambda_c$. For example, with a path difference of $(n+1/2)*\lambda_c$ and a following polarizer, a configuration may be achieved that is still advantageous, in which the transmission for the carrier frequency $f_c$ in an appropriate basic state is approximately 1 and varies only quadratically with the deviation from the basic state, while the group round-trip time varies linearly with this deviation.

The resonator arrangement 1 of the present invention may not only be used with free beam resonators, for instance in solid state lasers or lasers of a different type, but also in fiber lasers. It is contemplated to implement the resonator arrangement 1 or at least the interferometer 9 microscopically by means of waveguides.

For example, the present invention is appropriate for the amplification or filtering of optical radiation as well as for the generation of frequency combs and ultra-short pulses, respectively, in particular, with a variable adjustability and/or stabilization of a certain mode $f_c$, a given repetition rate or a predefined offset frequency $f_0$.

Figure 11:
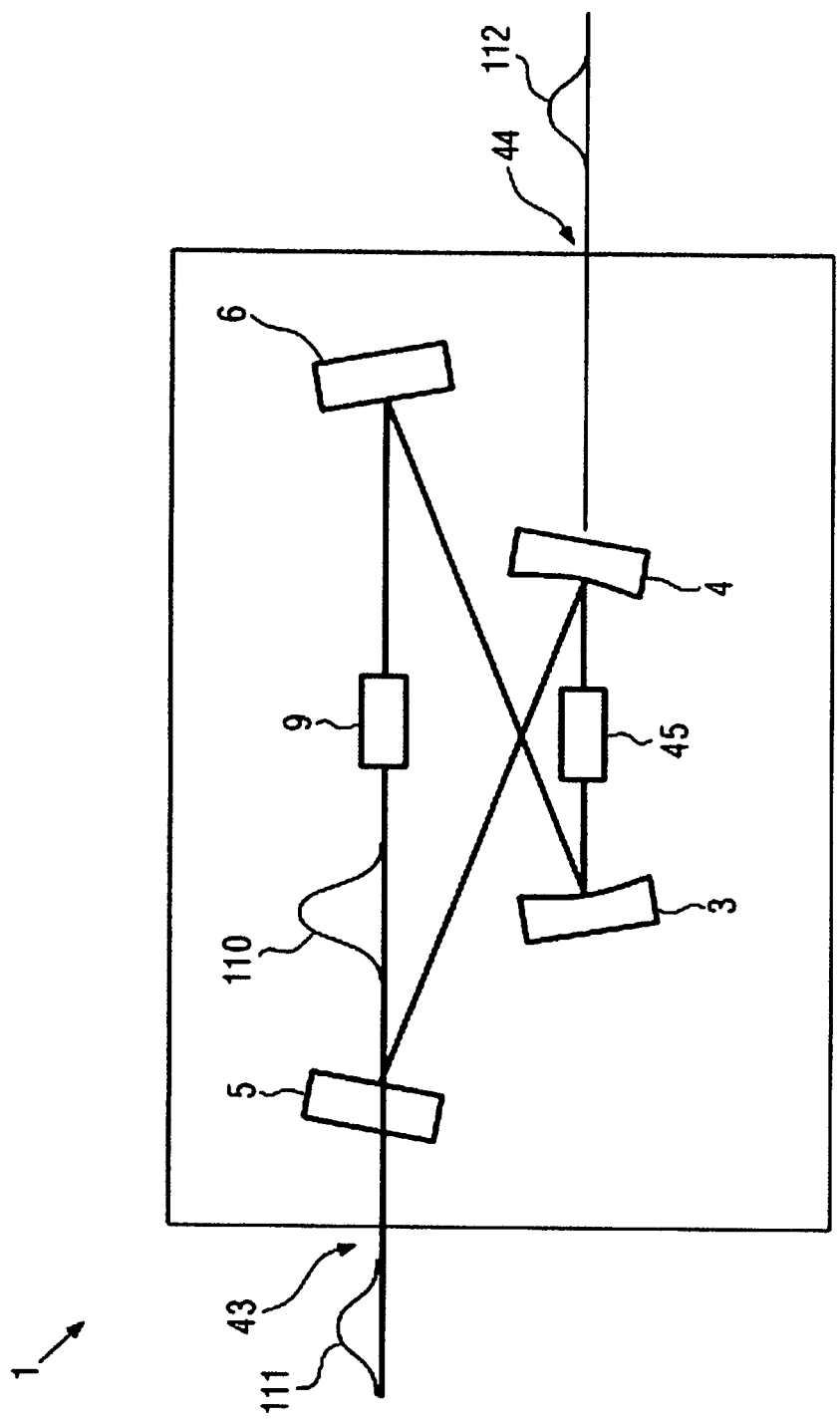

FIG. 11 illustrates an embodiment, in which the resonator 2 of the present invention is used as a filtering and/or amplifying resonator. The resonator configured in this example as a ring resonator having 4 mirrors 3, 4, 5, 6, receives at an inlet 43 an optical radiation 111 that preferably includes two or more different spectral components. The interferometer 9 is located within the resonator 2 so that the position of the resonances (modes) of the resonator may be adjusted by means of the interferometer 9. By means of the resonator 2, portions or the entirety of the incident radiation 111 are amplified and thus circulate as modified radiation 110 within the resonator 2 of the resonator arrangement 1. Optionally, a nonlinear optical element 45 is located in the resonator 2, which further modifies the resonator internal radiation 110 and, in particular, changes its frequency by sum frequency blending and/or difference frequency blending. The nonlinear optical element 45 may alternatively be appropriately configured for sum frequency blending and difference frequency blending or may be selected for generating or amplifying light by means of an optically parametric process or for generating radiation at the second harmonic (SHG) or at higher harmonics of the fundamental wave or carrier wave 120. By means of the generation of higher harmonics, UV light for EUV light may be generated, for example. To this end, the nonlinear optical element 45 may be, for example, a gas jet or a nonlinear optical crystal. The possibly modified resonator internal radiation is coupled out of the resonator 2 (as exiting radiation 112) at an outlet 44. The geometric configuration of the resonator 2 is of illustrative nature. For example, also a linear resonator 2 may be used or inlet and outlet 43, 44 may be combined.

Based on the illustrated embodiments the resonator arrangement 1 of the present invention may be modified in many ways for this purpose. In particular, it may be contemplated that in the interferometer 9 not only one first and one second interferometer legs 9a, 9b are provided, but more than two legs may be provided, wherein the splitting ratio is variably adjustable into two or more of the plurality of interferometer legs. This may be realized, for instance, when in one or both of the interferometer legs 9a, 9b in the interferometer 9 according to FIG. 4, a further interferometer is integrated, whose configurations again corresponds to the configuration according to FIG. 4 and which may, for instance, be realized in one of the variants illustrated in FIGS. 6 to 10. FIG. 9 itself is an example for such an interleaved interferometer 9. As already described above, not all wave plates have to be centred around the same wavelength (for example $\lambda_c$), thereby providing the potential for influencing the fixed point. Moreover, it is evident that a reflection or deflection of the optical path enables an optimized and component saving configuration. It should be appreciated again that instead of birefringence any other effect may be used, which causes a polarization dependent shift of propagation time or phase.

When used in frequency comb applications, the resonator of the present invention replaces the conventional laser source. Accordingly, the generated radiation may be varied in its characteristics by means of nonlinear steps, in particular by spectral broadening, frequency doubling or multiplying, difference frequency generation, sum frequency generation or Raman shift.

The invention claimed is:

1. An optical resonator arrangement comprising a resonator and
    an interferometer having at least a first and a second interferometer leg arranged within the resonator,
    the first interferometer leg has a first optical path length and the second interferometer leg has a second optical path length other than the first optical path length, and
    a splitting ratio, with which the interferometer splits radiation circulating in the resonator into the first and second interferometer legs, is variably adjustable,
    wherein the resonator arrangement is configured to change a repetition rate of the resonator and a carrier envelope offset frequency by changing the splitting ratio of the radiation circulating in the resonator into the first and second interferometer legs, such that in a frequency domain, a comb of frequencies of the radiation circulating in the resonator contracts or expands by a uniform factor about a fixed point.

2. The resonator arrangement according to claim 1, wherein the resonator arrangement comprises an actuator for adjusting the splitting ratio, the actuator having a control bandwidth of at least 10 kHz.

3. The resonator arrangement according to claim 2, wherein the resonator arrangement comprises a measurement apparatus configured to measure a shift of the resonant lines obtained by the actuator.

4. The resonator arrangement according to claim 1, wherein the interferometer comprises at least one optical element having at least one of a polarization dependent propagation time shift and a phase shift.

5. The resonator arrangement according to claim 4, wherein the at least one optical element causes a phase shift of an integer or half-integral multiple of $2\pi$ for a target wavelength ($\lambda_z$).

6. The resonator arrangement according to claim 1, wherein the interferometer includes one or more of the following optical elements: a polarization filter, a polarization adjuster, a $\lambda$ plate, a n$\lambda$ plate with n≥2, a $\lambda$/2 plate, a $\lambda$/4 plate, an electro-optical modulator and a variably adjustable liquid crystal.

7. The resonator arrangement according to claim 4, wherein at least two optical elements with polarization dependent phase shift are present in the resonator, and the splitting ratio of the radiation circulating in the resonator for the first and second interferometer legs is adjustable by adjusting an orientation of the two optical elements relative to each other and/or by differently influencing the polarization of the radiation passing through the two optical elements.

8. The resonator arrangement according to claim 1, wherein in the resonator is arranged a laser medium or an amplifier medium and/or a mode coupling element for the radiation circulating in the resonator, and the laser medium and the amplifier medium, respectively, are configured to be pumped.

9. The resonator arrangement according to claim 1, wherein the transmission of the resonator for the radiation circulating therein remains constant or substantially constant upon a variation of the splitting ratio of the radiation for the first and second interferometer legs.

10. The resonator arrangement according to claim 1, wherein the mode spacing of the resonator is an integer multiple of the mode spacing of radiation incident in the resonator, or the mode spacings of the resonator and incident radiation are related to each other by a rational ratio.

11. The resonator arrangement according to claim 1, wherein the resonator arrangement is configured to filter and/or amplify optical radiation, a nonlinear optical element is arranged within the resonator of the resonator arrangement and the nonlinear optical element is selected to generate the second or higher harmonic of the radiation circulating in the resonator, to generate radiation by means of sum frequency generation or difference frequency generation or to generate or amplify radiation by means of optical-parametric processes.

12. A fiber laser, a frequency comb generator, an active or passive mode coupled laser having a mode coupling element, or an injection stabilized laser, each comprising an optical resonator arrangement according to claim 1.

13. A method for adjusting a repetition rate ($f_{rep}$) of a resonator or a round-trip time (i) of radiation or pulses circulating in a resonator, the method comprising
    splitting, by an interferometer positioned within the resonator, pulses circulating in the resonator into a first pulse portion that passes through a first interferometer leg having a first optical path length and into a second pulse portion that passes through a second interferometer leg having a second optical path length,
    causing the first and second pulse portions to interfere with each other after passing through the interferometer,
    the method further comprising varying the splitting ratio, with which the interferometer splits the pulses circulating in the resonator into the first and second pulse portions, so that the resonator changes a repetition rate and a carrier envelope offset frequency, such that in a frequency domain, a comb of frequencies of the radiation circulating in the resonator contracts or expands by a uniform factor about a fixed point.

14. The method according to claim 13, wherein upon varying the splitting ratio, the group round-trip time ($\tau$) of the pulses circulating in the resonator is varied without changing a phase round-trip time of a carrier wave in the resonator.

15. The method according to claim 13, wherein round-trip losses of pulses circulating in the resonator are not or substantially not changed when varying the splitting ratio, with which the interferometer splits the pulses circulating in the resonator into the first and second pulse portions.

16. The method according to claim 13, wherein the interferometer comprises at least one optical element with polarization dependent phase shifting, and wherein the splitting ratio, with which the interferometer splits the pulses circulating in the resonator into the first and second pulse portions, is varied by rotating the optical element around an optical axis of the resonator or by changing the polarization at this optical element.

17. The method according to claim 16, wherein the optical element causes a polarization dependent phase shift of $m \cdot 0.5 \cdot \pi$ for a given target wavelength ($\lambda_z$), where m is a integer.

18. The method according to claim 13, wherein the variation of the splitting ratio, with which the pulses circulating in the resonator are split into the first and second pulse portions, is accomplished by varying a polarization dependent phase and/or a polarization angle of the pulses at an inlet of the interferometer.

19. The method according to claim 18, wherein the phase is changed by an angle $\Delta\phi$ or the polarization is changed by an angle $\Delta\theta$, and wherein the group delay in the resonator caused by a change of the group velocity of the pulses is $\Delta\phi_g$, wherein a conversion factor of $\Delta\phi_g/\Delta\phi$ or $\Delta\phi_g/(2\cdot\Delta\phi)$ is greater than 1.

20. The resonator arrangement according to claim 2, wherein the control bandwidth is at least 100 kHz.

21. The resonator arrangement according to claim 20, wherein the control bandwidth is at least 1000 kHz.

22. The resonator arrangement according to claim 3, wherein the measurement apparatus is configured to measure at least one of a repetition rate ($f_{rep}$) of the resonator and a carrier envelope offset frequency (f) of a frequency comb generated or received by the resonator.

23. The resonator arrangement according to claim 4, wherein the at least one optical element is a birefringent optical element.

24. The resonator arrangement according to claim 5, wherein the at least one optical element is an integer or half-integral wave plate.

25. The resonator arrangement according to claim 11, wherein the nonlinear optical element is a gas jet or a crystal.

26. The method according to claim 15, wherein the pulses are the carrier wave.

27. The method according to claim 16, wherein the at least one optical element is a birefringent element.

28. The method according to claim 17, wherein m is an even number.

29. The method according to claim 19, wherein the conversion factor is greater than or equal to n or an integer multiple of n.

30. An optical resonator arrangement comprising a resonator,
an interferometer having at a first and a second interferometer leg arranged within the resonator,
the first interferometer leg has a first optical path length and the second interferometer leg has a second optical path length other than the first optical path length,
a splitting ratio, with which the interferometer splits radiation circulating in the resonator into the first and second interferometer legs, is variably adjustable, and
an actuator configured to variably adjust the splitting ratio during operation of the optical resonator arrangement,
wherein the resonator arrangement is configured to change a repetition rate of the resonator and a carrier envelope offset frequency by changing the splitting ratio of the radiation circulating in the resonator into the first and second interferometer legs, such that in a frequency domain, a comb of frequencies of the radiation circulating in the resonator contracts or expands by a uniform factor about a fixed point.

31. An optical resonator arrangement comprising a resonator and an interferometer having at least a first and a second interferometer arranged within the resonator, the first interferometer leg has a first optical path length and the second interferometer leg has a second optical path length other than the first optical path length, and a splitting ratio, with which the interferometer splits radiation circulating in the resonator into the first and second interferometer legs, is variably adjustable, wherein during the operation of the optical resonator arrangement, the first optical path length and the second optical path length are both kept constant.

* * * * *